(12) United States Patent
Jain et al.

(10) Patent No.: US 12,430,492 B2
(45) Date of Patent: Sep. 30, 2025

(54) THEME-BASED DOCUMENT STYLE TRANSFER

(71) Applicant: Adobe Inc., San Jose, CA (US)

(72) Inventors: Ashish Jain, Delhi (IN); Avil Aneja, Rajasthan (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/107,772

(22) Filed: Feb. 9, 2023

(65) Prior Publication Data
US 2024/0273281 A1  Aug. 15, 2024

(51) Int. Cl.
*G06F 40/117* (2020.01)
*G06F 16/957* (2019.01)
*G06F 40/106* (2020.01)
G06F 3/0482 (2013.01)

(52) U.S. Cl.
CPC .......... *G06F 40/117* (2020.01); *G06F 16/957* (2019.01); *G06F 40/106* (2020.01); *G06F 3/0482* (2013.01)

(58) Field of Classification Search
CPC .... G06F 40/117; G06F 40/106; G06F 3/0482; G06F 16/9577
See application file for complete search history.

(56) References Cited

U.S. PATENT DOCUMENTS

| | | | | |
|---|---|---|---|---|
| 2014/0280167 A1* | 9/2014 | Ghessassi | ............. | G06F 16/285 707/738 |
| 2016/0179813 A1* | 6/2016 | Su | ..................... | G06F 16/24578 707/728 |
| 2016/0224999 A1* | 8/2016 | Mukherjee | ......... | G06Q 30/0203 |
| 2016/0294762 A1* | 10/2016 | Miller | .................... | H04L 67/306 |
| 2020/0301950 A1* | 9/2020 | Lorrain-Hale | ........ | G06F 40/117 |
| 2020/0342167 A1* | 10/2020 | Sivaji | .................... | G06F 40/186 |
| 2021/0042466 A1* | 2/2021 | Choi | ..................... | G06F 40/186 |
| 2021/0192126 A1* | 6/2021 | Gehrmann | ............. | G06N 20/00 |
| 2022/0035990 A1* | 2/2022 | Kaza | ..................... | G06F 18/214 |

OTHER PUBLICATIONS

Nayak, Pandu, et al., Introduction to Information Retrieval, CS276: Information Retrieval and Web Search, Lecture 6: Scoring, Term Weighting and the Vector Space Model, available online at https://web.stanford.edu/class/cs276/19handouts/lecture6-tfidf-6per.pdf, 2022, pp. 1-6.

\* cited by examiner

*Primary Examiner* — Beau D Spratt
(74) *Attorney, Agent, or Firm* — Kilpatrick Townsend & Stockton LLP

(57) ABSTRACT

Certain aspects and features of the present disclosure involve receiving theme-based input corresponding to a first document and generating document tags corresponding to the first document based on the theme-based input. The aspects and features further involve generating, using the document tags, a coefficient of similarity between the first document and library documents, and producing candidate documents from the library documents by comparing the coefficient of similarity for each of a number of library documents to a threshold. The aspects and features additionally involve selecting a second document from among the candidate documents and transferring at least one style from the second document to the first document based on an object similarity score corresponding to an object of a plurality of objects in the second document.

20 Claims, 7 Drawing Sheets

THEME-BASED DOCUMENT STYLE TRANSFER

TECHNICAL FIELD

The present disclosure generally relates to document design. More specifically, but not by way of limitation, the present disclosure relates to techniques for efficiently locating documents from a library of example or prior documents and automatically transferring relevant styles from objects within the example or prior documents.

BACKGROUND

Document designers often work on many documents. In many cases, the themes and styles of the documents of a particular designer are influenced or inspired by some previous document created by the designer, by other designers known to the designer, or by other designers in the same enterprise. While creating styles for a new document design, the designer may sift through previous documents based on a similar theme and then try to visualize whether the styles used in the previous documents would give the current document design a desirable appearance. When all of the styles of a selected, previous document are loaded, and the designer can examine the document and pick and apply the appropriate styles to the relevant objects in the new document design, observing the results to determine which styles have the most visually pleasing or salient appearance in the new document.

SUMMARY

Certain aspects and features of the present disclosure relate to theme-based document style transfer. For example, a method involves receiving theme-based input corresponding to a first document and generating document tags corresponding to the first document based on the theme-based input. The method further involves generating, using the document tags, a coefficient of similarity between the first document and library documents. The method also involves producing candidate documents from the library documents by comparing the coefficient of similarity for each of a number of library documents to a threshold. The method additionally involves selecting a second document from among the candidate documents and transferring at least one style from the second document to the first document based on an object similarity score of an object of a plurality of objects in the second document.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
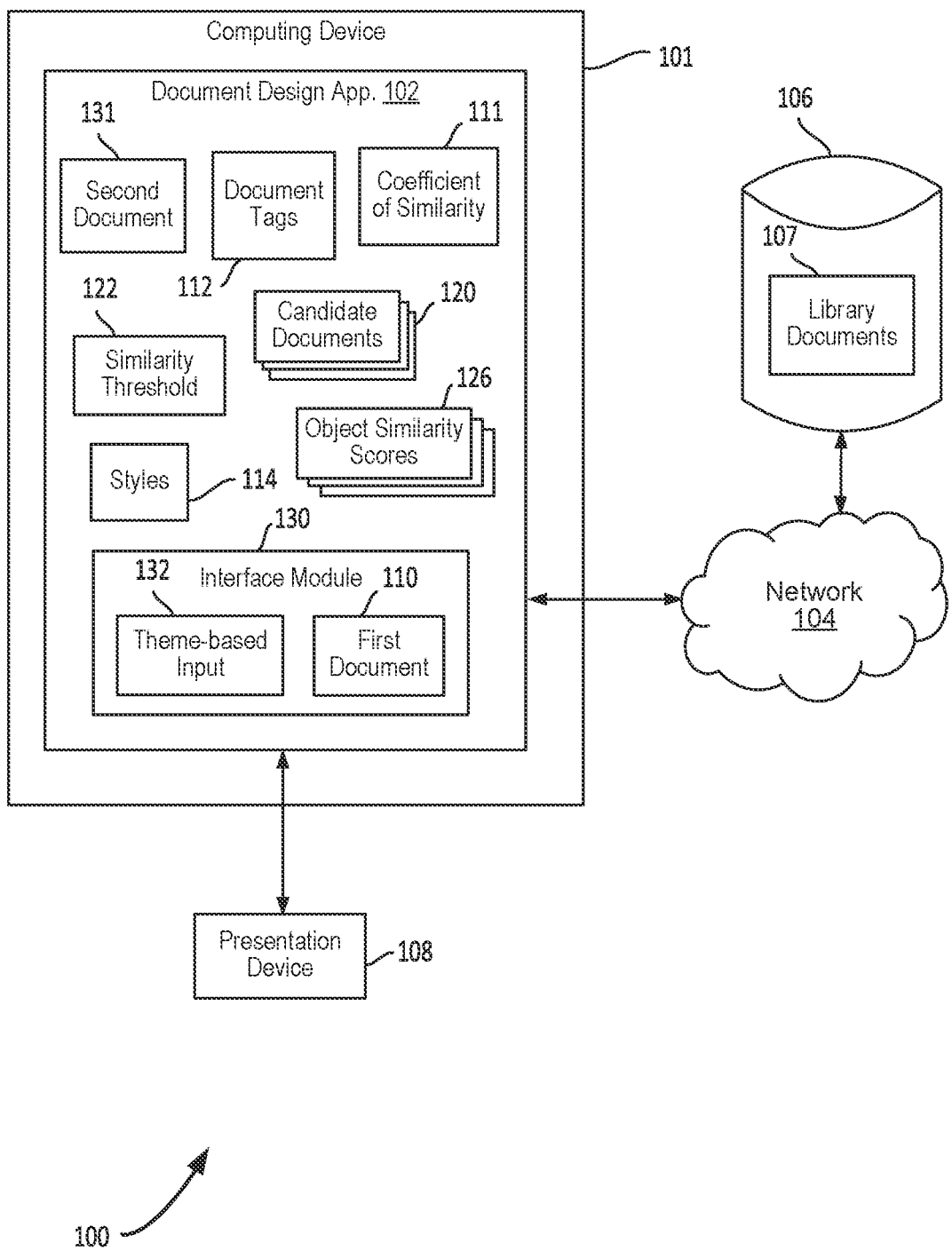
FIG. 1 is a diagram showing an example of a computing environment that provides theme-based document style transfer according to certain embodiments.

While creating styles for a new document design, a designer may review previous documents having a similar theme and then visualize whether the styles used in the previous documents would be appropriate for a current document design. This process may involve manually searching through relevant documents, which can be quite time-consuming. When all the styles of a selected, previous document are loaded, the designer can pick and apply the appropriate styles to the relevant objects in the current document design, observing the results. The designer can then undo some styles and try others to obtain the most desirable result for the document. The process of picking styles is conducted on an object-by-object basis. Some styles may be appropriate for titles, some for body text, some for images, etc. Thus, even when the designer locates a document of interest, there is further time-consuming manual effort involved in selecting styles to transfer.

Embodiments described herein address the above issues by providing a document design application that, based on input from a designer, generates document tags corresponding to the active document, that is, the document that is being designed. The tags are used in determining similarity between the active document and available, existing documents in order to produce candidate documents for style transfer. One or more of the candidate documents can be selected and object similarity scores for objects in the selected document(s) can be used to automatically and selectively transfer one or more styles to the active document. The various operations in the process that is triggered by the initial search input can be conducted autonomously or with additional input from the document designer to guide the process.

Theme-based searching for previous documents that can be used for style transfer and automated analysis of a selected document to find compatible styles provides for faster document creation. The process, once initiated, can be carried out with any of various levels of control as desired by a document designer. Alternatively, the process can be completely automated, even to the point of automatically setting styles for an entire document once text and images have been provided. The level of automation that can be achieved can be used either to make document creation more efficient and faster for professional document designers or to easily make polished, professional, original documents for amateurs such as small business owners and hobbyists.

For example, a document design application receives input corresponding to a document theme that may be applied to a first document, also referred to in the examples herein as the active document. In some examples, the active document is a document being created or edited using the document design application. This input is designed to search for documents with similar styles. It may be, for example, a selection of an explicit theme selected from a list of options or otherwise determined from input, or a direction to search based on an active-document based theme, i.e., a theme already applied to the active document. An already applied theme can be referred to as an active-document theme. The document design application generates document tags corresponding to the active document based on the theme-based input and uses the tags to generate a coefficient of similarity between the active document and library documents. The document tags can include, as examples, text tags and/or image tags. The document design application can then produce candidate documents from the library documents by comparing the coefficient of similarity for library documents to a threshold.

A second document is selected by the document design application from among the plurality of candidate documents and at least one style is transferred from the second document to the active document based on an object similarity score. The second document may be referred to in the examples herein as the selected document. The selection of the second document can take place in response to input provided, or the selection can be made automatically, for example, based on the object similarity score or a theme-based similarity score. The style transfer can be carried out by the document design application extracting style attributes from objects in the selected document and applying the style attributes to target objects in the active document. An object similarity score for objects in the second document can optionally be calculated and compared to a threshold to transfer a style.

In some examples, candidate documents can be prioritized based on the theme-based similarity score and candidate documents can be previewed, for example, by displaying a portion of each of the candidate documents in priority order. The best-scoring document can be assigned the highest priority and its preview can include more detail, for example, by providing a preview of one or more of its individual themes in this highest priority document.

The use of theme-based input to search for previous documents that can be used for style transfer, combined with an automated analysis of a selected document to find compatible styles to be transferred, improves the speed and efficiency of document creation. Manual searching for relevant documents and styles can be eliminated, and style transfer can be accomplished in a fully automated fashion. The document design application can be customized to provide the level of automatic style transfer desired.

FIG. 1 is a diagram showing an example 100 of a computing environment that provides theme-based document style transfer according to certain embodiments. The computing environment 100 includes a computing device 101 that executes a document design application 102, a memory device 106, and a presentation device 108 that is controlled based on the document design application 102. The memory device 106 is communicatively coupled to computing device 101 using network 104. Memory device 106 is configured to store library documents 107 for use as candidate documents 120 for theme-based document style transfer. Document tags 112 can be used to locate candidate documents 120 from among library documents 107 for theme-based style transfer. In this example, the document design application 102 includes the first document 110 (the document being edited or the "active document") and the stored coefficient of similarity value 111 that is compared to stored similarity threshold 122 in order to select candidate documents 120 from among library documents 107. The first document is being presented and/or edited via interface module 130 of document design application 102.

Still referring to FIG. 1, styles 114 from one or more documents are stored and filtered by document design application 102. At one or more styles 114 are ultimately applied or transferred from a second document 131 (a selected document) among the candidate documents 120 to first document 110. The document similarity threshold 122 can be set automatically by document design application 102 and controls how many or few candidate documents are provided from among library documents 107. Alternatively, the value can be set as part of a settings menu accessible within document design application 102. Styles can be transferred based on object similarity scores for objects in the selected document as compared to corresponding objects in the active document.

In the example of FIG. 1, interface module 130 of document design application 102 receives theme-based input 132 in order to search library documents 107 and obtain candidate documents 120. Theme-based input can be used for finding candidate documents 120 and automated analysis of a selected document to find compatible styles for the active document. Theme-based input can be, as an example, a selection or indication provided to document design application 102 to use the themes in the first document as a guide to find candidate documents with similar styles. Theme-based input may also involve the express input of a theme, for example, using a document search interface that can be used to access the library documents 107.

In some embodiments, the document design application 102 uses input from a separate input device (not shown) such as a mouse, keyboard, etc. The document design application 102 renders first document 110 to be displayed on presentation device 108, which in some cases may include input capability such as through a touch screen display or similar multifunction hardware that also receives user input. Embodiments as described herein can be implemented on many kinds of computing devices.

Figure 2:
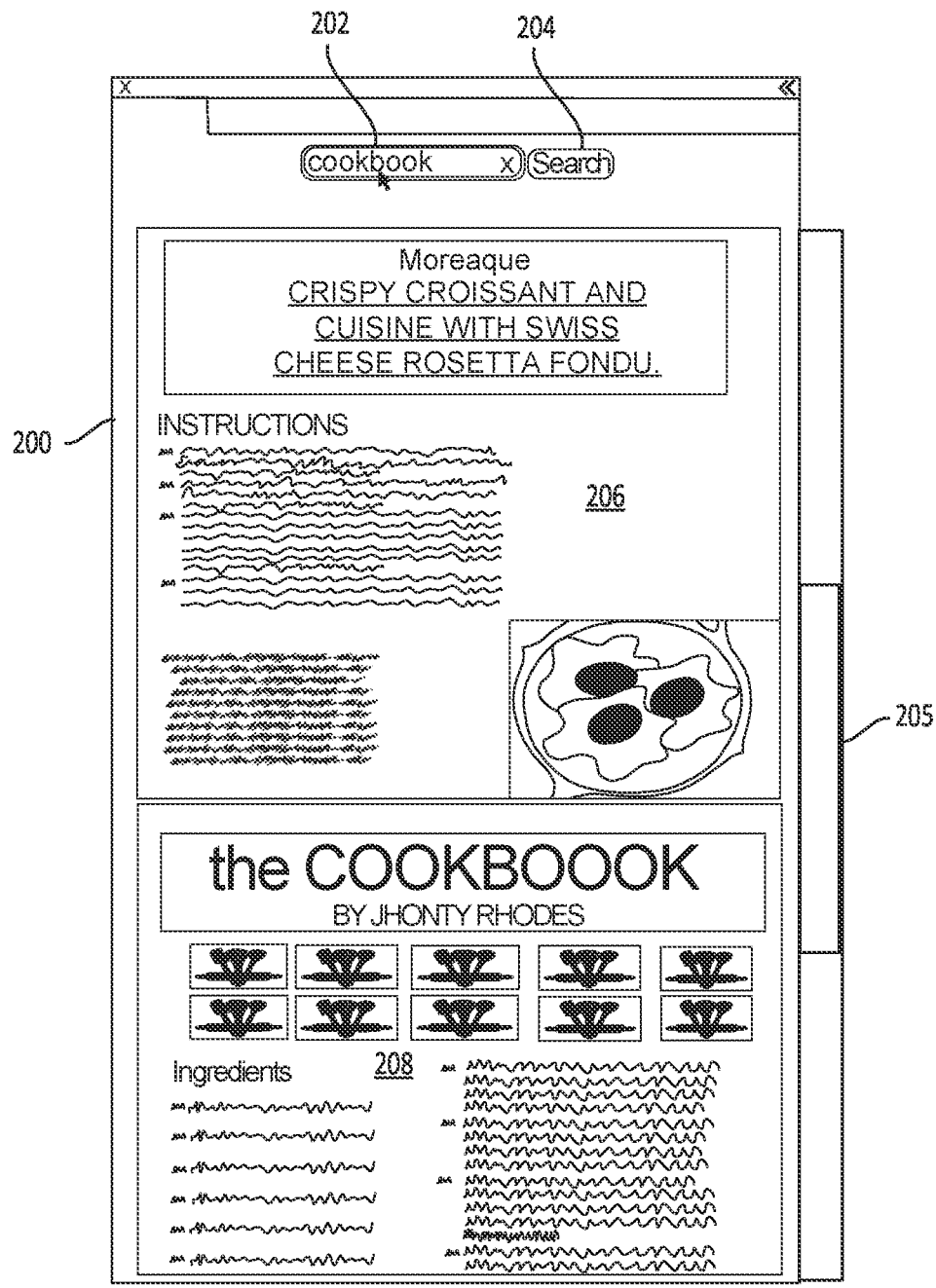
FIG. 2 is an example of theme-based search window for theme-based document style transfer according to certain embodiments.

FIG. 2 is an example of theme-based search window 200 for theme-based document style transfer according to certain embodiments. Search window 200 can be presented on presentation device 108. In the example of FIG. 2, a search term consistent with a desired theme serves as theme-based input into search box 202 and the search button 204 can be selected to execute the search. In other examples, if an active document is being edited and theme information is present, the theme or themes in the active document can be used to search automatically. Window 200 is scrollable using scroll bar 205. The search obtains multiple candidate documents for use in applying one or more styles to the active document. In the view in FIG. 2, candidate document thumbnail 206 and a candidate document thumbnail 208 are discernable as a portion of each document presented. A document from among the candidate documents can be selected, and styles from this selected document can be transferred to the active document, either automatically or with additional input. The styles can be transferred based on object similarity scores 126. In some examples, previews (not shown) of the active document with the applied styles can be generated as will be discussed in further detail with respect to FIGS. 4-6. A document can be selected, as an example, by clicking on the preview in search window 200, in which case the outline of the preview may be highlighted in the search window on presentation device 108.

Figure 3:
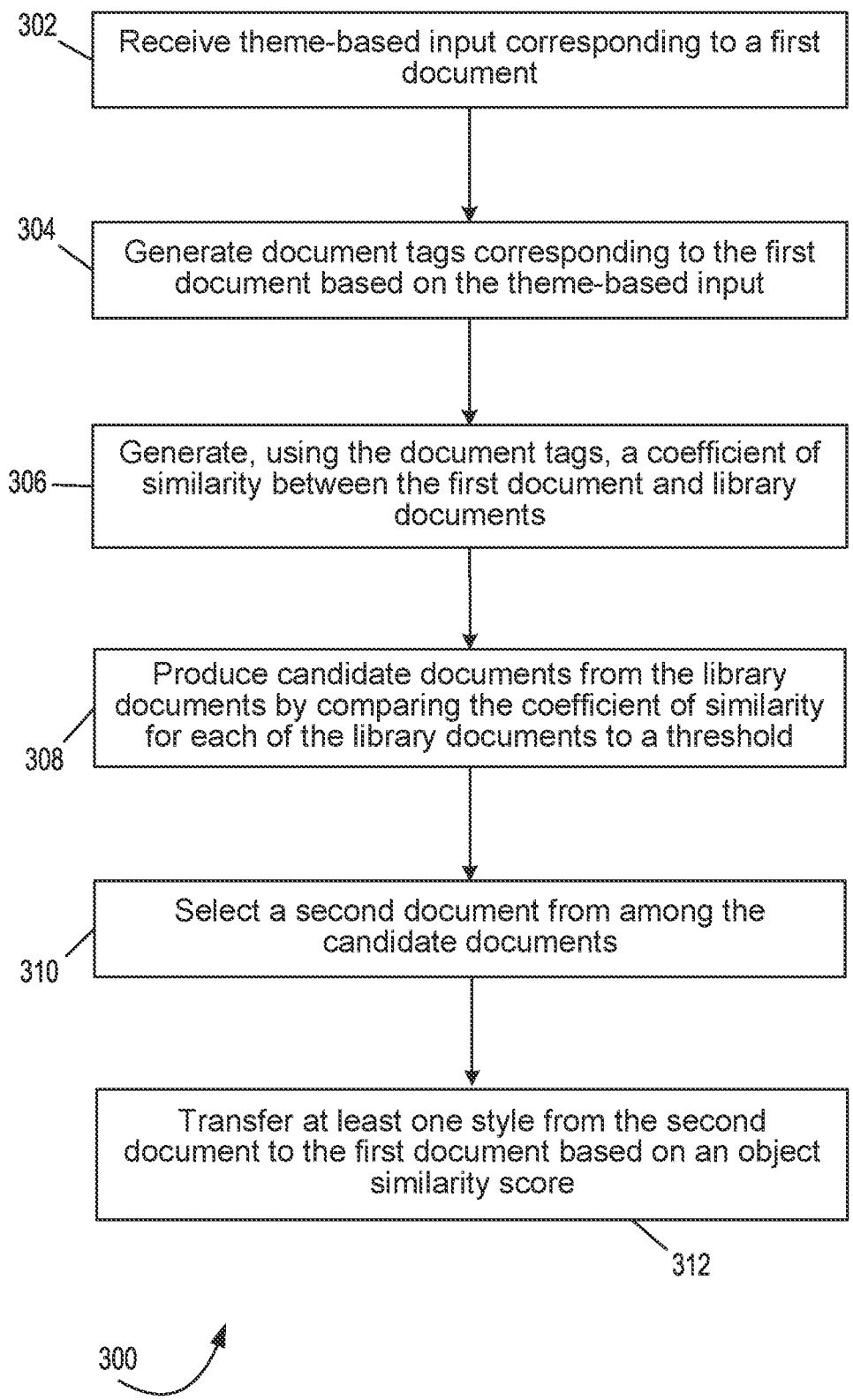
FIG. 3 is a flowchart of an example of a process for theme-based document style transfer according to some embodiments.

FIG. 3 is a flowchart of an example of a process 300 for theme-based document style transfer according to some embodiments. In this example, a computing device carries out the process by executing suitable program code, for example, computer program code for an application, such as document design application 102. At block 302, the computing device receives theme-based input corresponding to the first document. Theme-based input for purposes of this example corresponds to the active document either when a theme of the active document is expressly used for a search, or when input of a theme to be searched is received in connection with adding styles to the active document. For example, a menu entry can be selected to search documents worked on previously based on a theme that is similar to the active document. The theme of the active document can be determined programmatically, or the theme may be expressly input, for example, if a theme has not yet been set for the active document. The theme of a document corresponds to the overall nature of the document, for example, the topic and/or the type of document. A cookbook or a recipe may have a theme described as "cooking" or "food," as examples. At block 304, the computing device generates document tags corresponding to the first document based on the theme-based input.

Continuing with FIG. 3, at block 306, the computing device generates, using the document tags, a coefficient of similarity between the first document and each of at least some library documents. A subset of library documents or a specific library of documents can be defined or selected prior to this operation, or the entire library can be evaluated. At block 308, the computing device produces candidate documents from the library documents by comparing the coefficient of similarity for each of the available library documents to the stored document similarity threshold value. At block 310, the computing device selects the second document from among the candidate documents. The computing device may select a document automatically based on, as an example, the coefficient of similarity. For example, the document with the highest coefficient of similarity can be automatically selected. Alternatively, the computing device may receive a selection input of a candidate document to be the document used for style transfer. For example, the selection may be received through search window 200 by receiving a mouse click or touch input associated with a document preview while window 200 is being displayed on presentation device 108.

Staying with FIG. 3, at block 312, one or more styles are transferred from the second document, the selected candidate document, to the first document, the active document. The transfer can be made based on the object similarity score, which is a measure of how similar a given object in the selected document is to a corresponding object in the active document. As examples, the object similarity score may be based on a comparison between two images, or two blocks of text in the documents. The transfer can be made completely programmatically or can be based on input received by the computing device, for example, though interface module 130.

Unlike the theme of a document, a style within a document is connected with an object in the document, for example, a block of text, a graphic, or an image. A style can be thought of as a collection of characteristics. Using text as an example, a style may be that of a list, title, section header, etc. A text style may include characteristics such as font, size, capitalization, etc. Thus, transferring a style may include recognizing that a certain block of text is a title or section header and transferring the appropriate characteristics for such an object from one document to another within the context of a given theme for the document.

Figure 4:
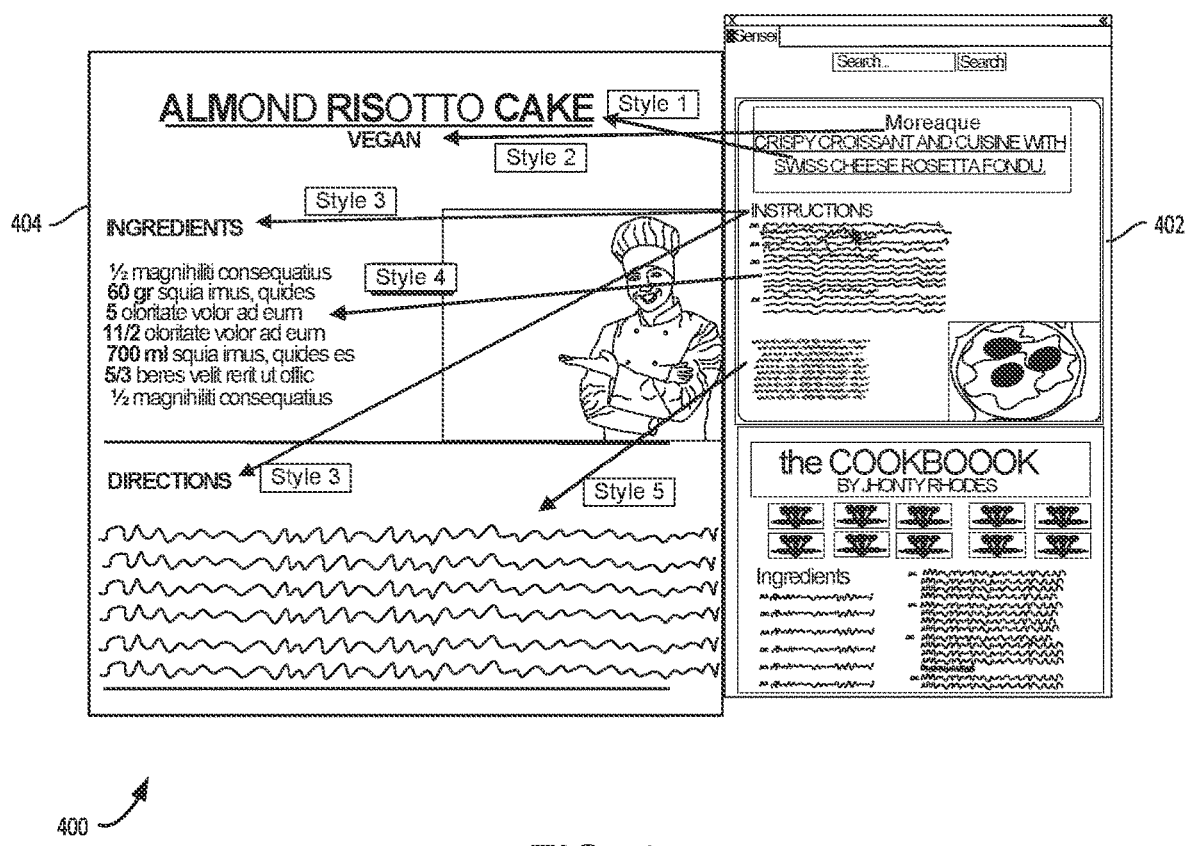
FIG. 4 is an example theme-based document style transfer display according to certain embodiments.

FIG. 4 is an example theme-based document style transfer display 400 according to certain embodiments. Display 400 may be output, as an example, to presentation device 108 using interface module 130. In display 400, the first document preview is selected in window 402. The selection of this top document triggers style transfer to the active document in window 404. Five styles, style 1, style 2, style 3, style 4, and style 5, are transferred as indicated by the arrows in FIG. 4. The styles can be transferred in a single click, either persistently, or in a preview mode wherein the transfer is reversed when input is received to transfer styles from another document, or to simply decline the transfer, for example, by clicking away. To transfer the styles persistently, as an example, window 402 can be closed. Both of the selected document in window 402 and the active document in window 404 include images and text. An image and a block of text can be treated as separate objects for style transfer. As an example, two blocks of text for which style 3 is transferred are for subtitles for sections of the documents involved. The active document window 404 can be rendered on the presentation device 108 to display the active document with one or more styles as transferred.

Figure 5:
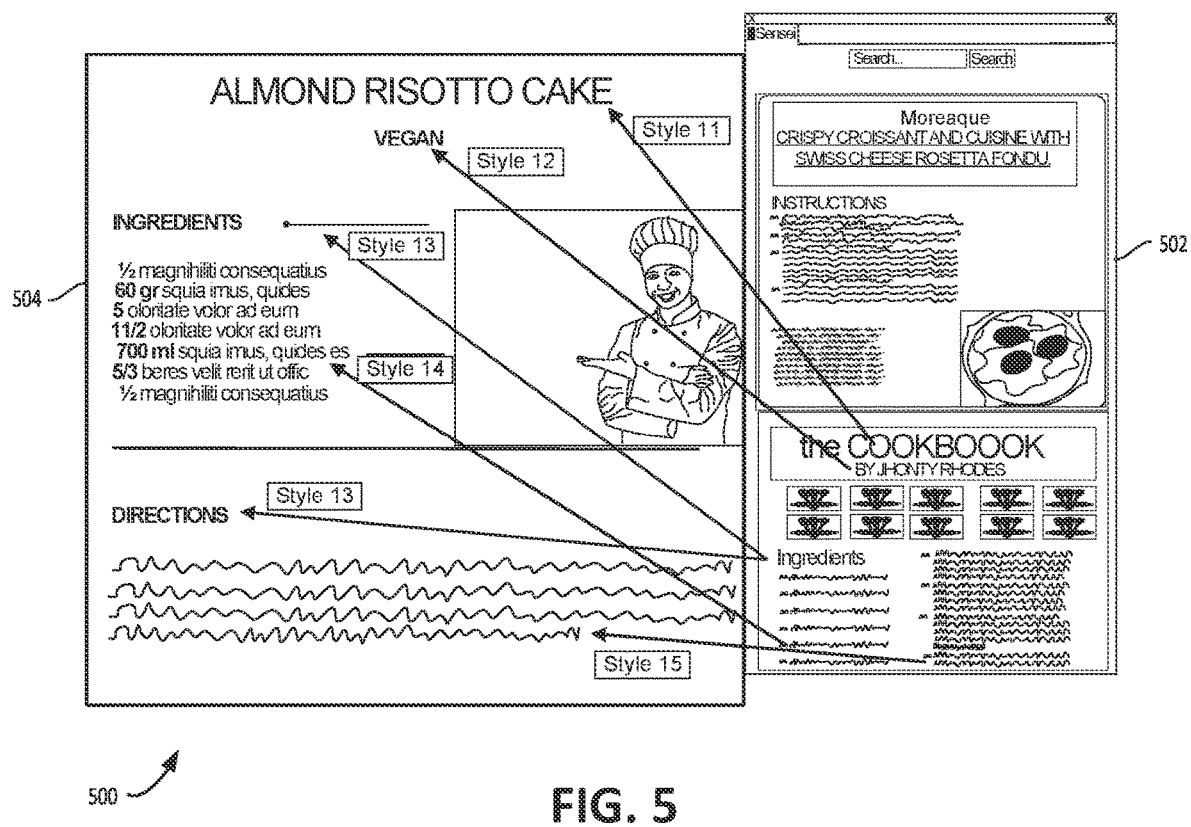
FIG. 5 is another example theme-based document style transfer display according to certain embodiments.
Figure 6:
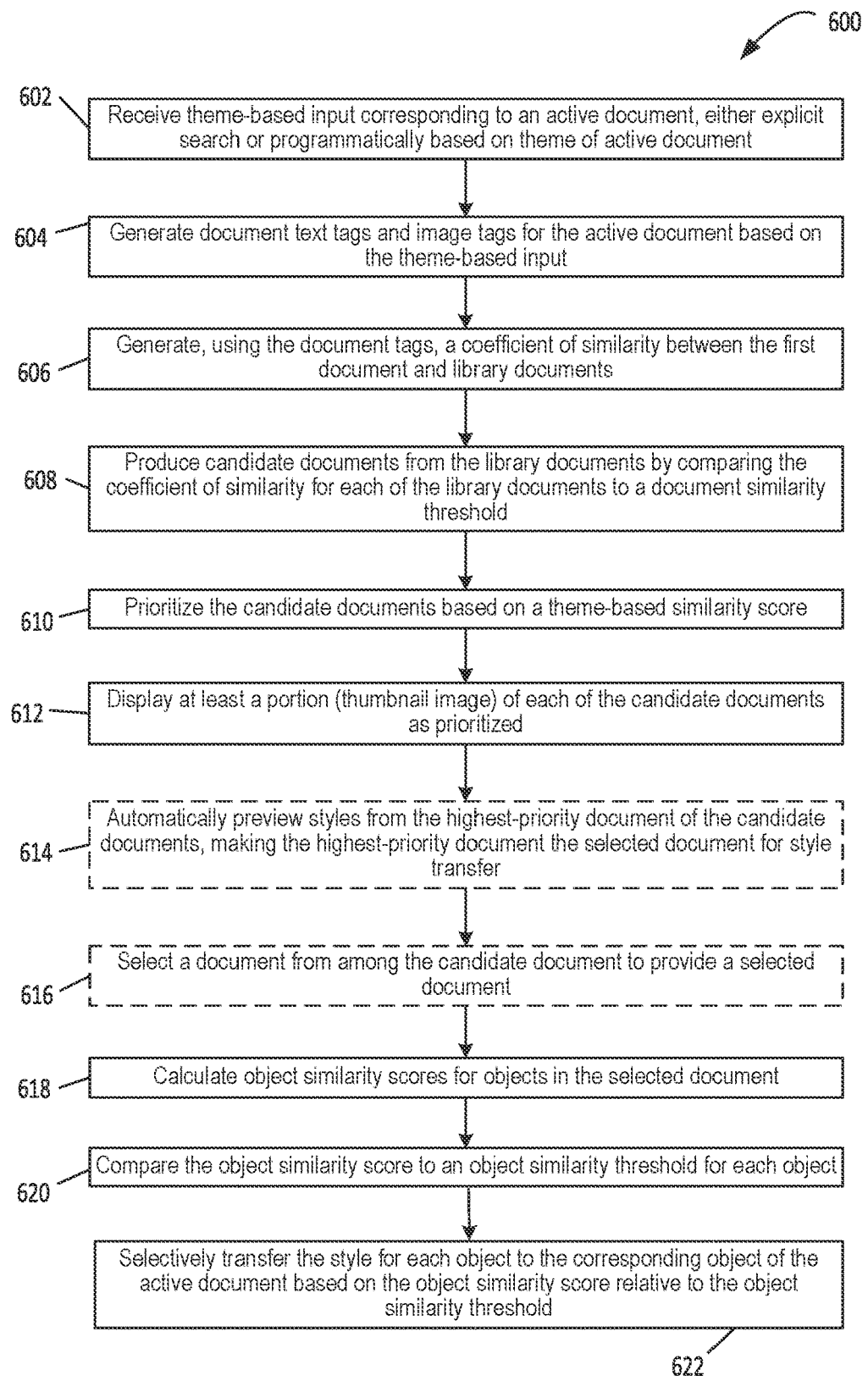
FIG. 6 is a flowchart of another example of a process for theme-based document style transfer according to some embodiments.

FIG. 5 is another example theme-based document style transfer display 500 according to certain embodiments. Display 500 may be output, as an example, to presentation device 108 using interface module 130. In display 500, the second document preview is selected in window 502. The selection of this second document triggers style transfer to the active document in window 504. Five styles, style 11, style 12, style 13, style 14, and style 15, are transferred as indicated by the arrows in FIG. 5. In a manner similar to that discussed with respect to FIG. 4, the styles can be transferred in a single click, either persistently, or in a preview mode. To transfer the styles persistently, as an example, window 502 can be closed. Both of the selected document in window 502 and the active document in window 504 include images and blocks of text, which can be treated as separate objects. The active document window 504 can be rendered on the presentation device 108 to display the active document with the one or more styles as transferred FIG. 6 is a flowchart of another example of a process 600 for theme-based document style transfer according to some embodiments. In this example, one or more computing devices carry out the process by executing suitable program code. Firstly, documents are searched and located based on a theme, using theme-based input. Secondly, one or more styles are transferred from a selected document to the active document.

At block 602, the computing device receives theme-based input corresponding to an active document, either an explicit search or a programmatically automatic search based on the theme of active document. At block 604, the computing device generates document text tags and document image tags for the active document based on the theme-based input. Suppose there is a set of library documents, {D1, D2, . . . Dn}. Further, assume the active document, currently being worked on, is Di. The problem statement corresponds to how to determine which library documents have themes, which are similar to either the theme of the current active document or a theme whose identity is otherwise input through the interface module. A tagging approach is used in this example to identify a document's theme. This tagging process can be divided into two parts, identifying text tags and identifying image tags.

For text tag identification, all text statements from a document can be copied to a text file to increase efficiency since the file can be processed under the assumption that only text is present. Statements can be processed using a text classification model to generate a tag corresponding to a statement. Images in the document can be readily identified and a tag for an image can be generated using an image classification model. From the tags generated, an array of tags for a given document can be created, for example:

$$Dj = \{wj1, wj2, \ldots, wjk\},$$

where k is the number of objects in document Dj.

At block 606 in FIG. 4, the computing device, using the document tags, generates a coefficient of similarity with the first document for each of the library documents of interest. At block 608, the computing device produces candidate documents from the library documents by comparing the coefficient of similarity for each of the library documents of interest to a document similarity threshold. The functions included in blocks 604-608 and discussed with respect to FIG. 6 can be used in implementing a step for producing candidate documents from library documents based on a coefficient of similarity for each of the library documents of interest.

Document similarity can be calculated, as examples, in at least two different ways, based on the theme-based input. If a theme is explicitly input, for example, via search box 202 and the search button 204 of window 200, an array corresponding to the query can be produced, for example:

$$q = \{w1, w2, w3, \ldots, wm\}.$$

For every document a coefficient of similarity can be generated from the array. As one example, Jaccard's similarity can be generated by:

$$J(q, Dj) \forall j \in [1, n].$$

If the value returned by this query for a given library document is greater than the document similarity threshold, the document will be one of the candidate documents provided, for example, by display on presentation device 108, for example, in window 200.

If the document similarity is to be determined based on the theme of the active document, the array of tags corresponding to the active document can be used. In such an example, the array of tags becomes:

$$Dj = \{wi1, wi2, \ldots, wik\}.$$

Jaccard's coefficient can then be calculated by:

$$J(Di, Dj) \forall j \in [1, n] - \{i\}.$$

Candidate documents selected in this way can be provided, as an example, by display on presentation device 108.

Staying with FIG. 6, at block 610, the computing device prioritizes the candidate documents based on a theme-based similarity score and at block 612, the computing device displays at least a portion of each of the candidate documents as prioritized, that is, in priority order. For example, thumbnails of the documents can be displayed in window 200 on presentation device 108 with the thumbnail of the document with the highest similarity score at the top, the thumbnail of the document with the next highest similarity score immediately below the first, etc. Optionally at block 614, the computing device automatically previews styles from the highest-priority document of the candidate documents, programmatically making the highest-priority document the selected document for style transfer. Styles can then be previewed as applied to the active document without any input being required. Optionally, at block 616, a document is selected to apply styles in some either way, for example, in response to input to the computing device. The computing device can execute the operation of block 616 either when the automatic selection and preview of block 614 is not being used, or to override the automatic selection and preview of block 614.

Continuing with FIG. 6, at block 618, the computing device calculates object similarity scores for objects in the selected document, and at block 620, the computing device compares the object similarity score to an object similarity threshold for each object. The purpose of using object similarity scores is to find objects that are similar in look and feel between the two documents. Styles can then be transferred between similar objects while maintaining the same or similar overall aesthetic for the active document.

At block 622, the computing device selectively transfers the style for each object of interest to the corresponding object of the active document. By the term "selectively," what is meant is that the computing device transfers the style or not on an object-by-object basis. For example, the style can be transferred or not based on the object similarity score relative to the object similarity threshold. The functions included in blocks 618-622 and discussed with respect to FIG. 6 can be used in implementing a step for transferring at least one style from the second document to the first document based on an object similarity score of an object in the second document. To transfer styles, style attributes can be extracted for objects that are similar and the extracted attributes can be applied to similar objects.

For style transfer, attributes can be defined for calculating an object similarity score. In such an example, styles are transferred for corresponding objects where an object similarity score is higher than an object similarity threshold. The object similarity threshold can be programmatically coded into a document design application or set by configuration menu or other input. Using text objects as an example, attributes for use by an algorithm that finds the most similar objects in the two documents in question can include, as examples, textSize, textFrameRelativePosition, and textFrameShape. textSize represents the size of the text in a given frame or associated with the given object. textFrameShape represents the shape of a frame, if any, that contains text. Shapes can include, as examples, circle, rectangle, parallelogram, star, etc.

textFrameRelativePosition is the relative position of the object in the document. In this example, it as a two-dimensional parameter based on xy coordinates. The x-coordinate is for the text frame center relative to the length of the document. The y-coordinate is for the text frame center relative to the width of the document. For the active document D1 and the selected document D2, the following nomenclature is used in this example:

$$D1: \{t11, t12, t13, \ldots, t1n1\},$$

where tij represents the jth textFrame of the ith document. An example algorithm for finding the most similar object for each object in the active document (D1) is shown below. For each object of interest in D1 it calculates a similarity value with all objects of the selected document (D2) and the object having the maximum normalized similarity value, if greater than the object similarity threshold, is marked as the object of interest. Its styles can be applied to the corresponding object in D1. This similarity value is based on the attributes defined above. A weighted average across the attributes with the maximum dependency on the textSize can be used.

```
dict textFrameMapping = { }
sumForNormalisation = 0
for each D1textFrameObject in D1->textFrameSet:
    maxSimilarityValue = 0
    maxSimilarityObject = NULL
    for each D2textFrameObject in D2->textFrameSet:
        similarityValue = getSimilarityValue(D1textFrameObject, D2textFrameObject)
        sumForNormalisation = sumForNormalisation + similarityValue
        if(similarityValue > maxSimilarityValue):
            maxSimilarityValue = similarityValue
            maxSimilarityObject = D2textFrameObject
    if(maxSimilarityObject && maxSimilarityValue/ sumForNormalisation > threshold)
        textFrameMapping.append(D1textFrameObject , maxSimilarityObject)
applyStyles(D1 , textFrameMapping)
```

The getSimilarity Value function returns the similarity of the two objects belonging to the same set of textFrame. A formula to calculate the similarity can be defined as:

```
def getSimilarityValue (textFrameObject1 , textFrameObject2):
    similarityValue = 0.7*| textFrameObject1.textSize − textFrameObject2.textSize|/
        textFrameObject2.textSize +
    0.2*eucledian(textFrameObject1. textFrameRelativePosition , textFrameObject2.
        textFrameRelativePosition) +
    0.1*getShapeSimilarityValue(textFrameObject1. textFrameShape , textFrameObject2.
        textFrameShape)
    return similarity Value
```

The attributes of the textFrameObject used in the above example to get a similarity value between two objects are as follows. Text Size is the dimension used to compare the two text objects. If two frames have the highest size in their respective documents, there a high probability that these two objects represent headings or titles. Thus, the styles of the D2 text frame with maximum-sized text should be applied to the D1 text frame with maximum-sized text. Therefore, for the similarity value, the difference of size is provided as an attribute with a 70% weight. Where differences are larger because of a drastic size mismatch in the headings of two documents, the difference can be normalized by dividing it by the selected document size.

Text position is used in this example as an attribute with a 20% weighting. The Eucledian distance of the relative positions of the text frames can be taken into account for the positioning into the frame. If a decision cannot be made based on text size the positioning of the text frame can be used. For similar text frames, transfer can be made based on position, i.e., if there are two text frames, one on the extreme left and one the extreme right, which have similar sizes, then the style of the left text frame is applied to the corresponding left frame (or the nearest position) in D1. The shape of the text frame can be considered and can be given a 10% weighting in decisioning with respect to application of a text frame style to the active document. If size and position differences are insignificant, matching shapes can control the application of a style for a frame.

Figure 7:
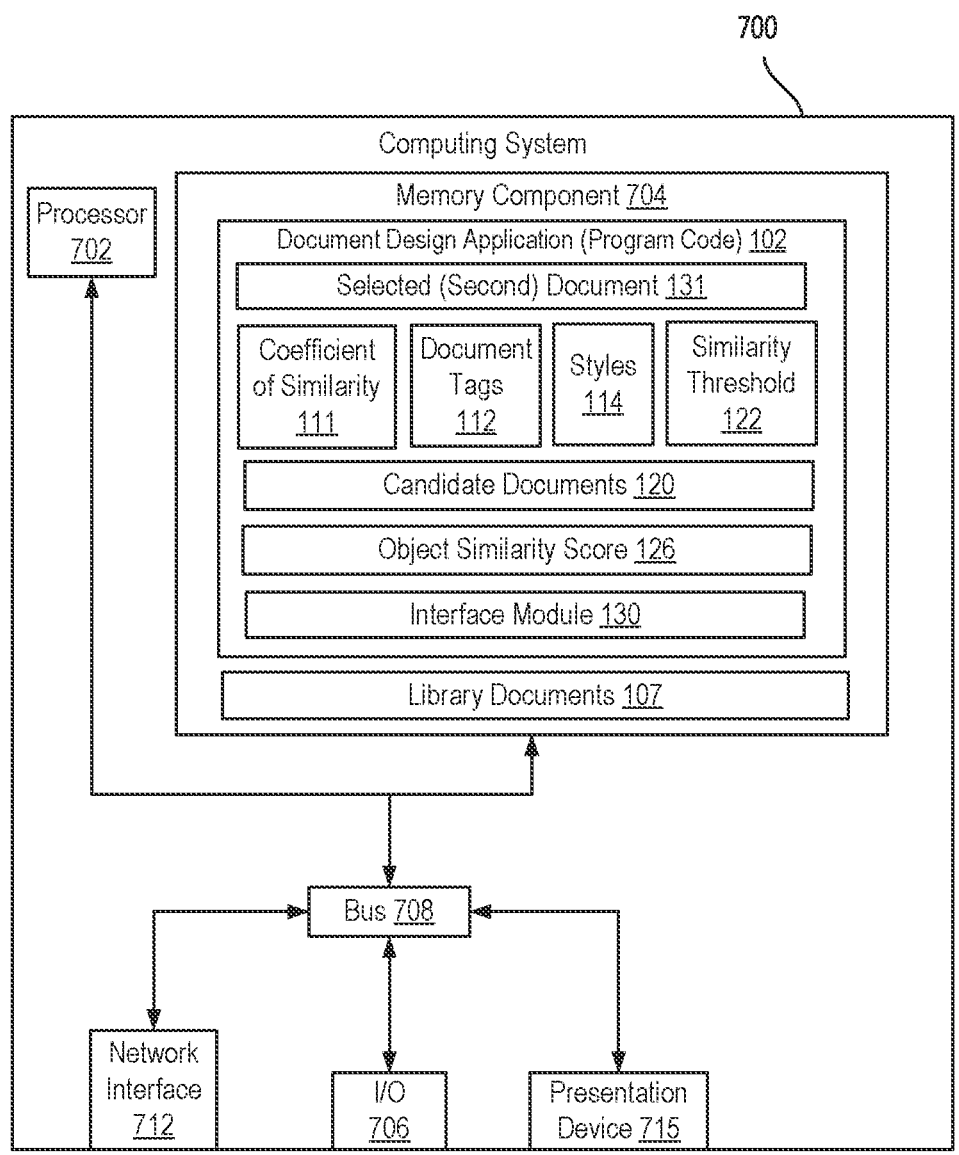
FIG. 7 is a diagram of an example of a computing system that provides theme-based document style transfer according to certain embodiments.

FIG. 7 is a diagram of an example of a computing system 700 that provides theme-based document style transfer according to certain embodiments. System 700 includes a processing device 702 communicatively coupled to one or more memory devices. The processing device 702 executes computer-executable program code stored in the memory component 704. Examples of the processing device 702 include a microprocessor, an application-specific integrated circuit ("ASIC"), a field-programmable gate array ("FPGA"), or any other suitable processing device. The processing device 702 can include any number of processing devices, including a single processing device. The memory component 704 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 7, the computing system 700 may also include a number of external or internal devices, for example, input or output devices. For example, the computing system 700 is shown with one or more input/output ("I/O") interfaces 706. An I/O interface 706 can receive input from input devices or provide output to output devices (not shown). Output may be provided using the interface module 130 of the document design application 102, which displays the active document while memory component 704 stores the selected document 131. The selected document can also be displayed via the interface module 130. One or more buses 708 are also included in the computing system 700. The bus 708 communicatively couples one or more components of a respective one of the computing system 700. The processing device 702 executes program code that configures the computing system 700 to perform one or more of the operations described herein. The program code includes, for example, document design application 102 or other suitable applications that perform one or more operations described herein. The program code may be resident in the memory component 704 or any suitable computer-readable medium and may be executed by the processing device 702 or any other suitable processor. Memory component 704, during operation of the computing system, can store a value 111 for the current coefficient of similarity, the candidate documents 120, the styles 114 to be evaluated and/or transferred, and the document tags 112. Memory component 704 is also used to store a value of the document similarity threshold 122.

The system 700 of FIG. 7 also includes a network interface device 712. The network interface device 712 includes any device or group of devices suitable for establishing a wired or wireless data connection to one or more data networks. Non-limiting examples of the network interface device 712 include an Ethernet network adapter, a wireless network adapter, and/or the like. The system 700 is able to communicate with one or more other computing devices (e.g., another computing device executing other software, not shown) via a data network (not shown) using the network interface device 712. Network interface device 712 can also be used to communicate with network or cloud storage used as a repository for the document library.

Staying with FIG. 7, in some embodiments, the computing system 700 also includes the presentation device 715. A presentation device 715 can include any device or group of devices suitable for providing visual, auditory, or other suitable sensory output. In examples, presentation device 715 displays input and/or rendered images. Non-limiting examples of the presentation device 715 include a touchscreen, a monitor, a separate mobile computing device, etc. In some aspects, the presentation device 715 can include a remote client-computing device that communicates with the computing system 700 using one or more data networks. System 700 may be implemented as a unitary computing device, for example, a notebook or mobile computer. Alternatively, as an example, the various devices included in system 700 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," "accessing," "comparing," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. The endpoints of ranges and/or comparative limits are intended to encompass the notion of quality. Thus, expressions such as "greater than" should be interpreted to mean "greater than or equal to."

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   receiving theme-based input corresponding to a first document;

processing, in response to the theme-based input, one or more text statements from the first document using a text classification model and one or more images from the first document using an image classification model to generate a plurality of document tags corresponding to the first document;

generating, using Jaccard's similarity applied to at least some of the plurality of document tags, a coefficient of similarity between the first document and a plurality of library documents;

producing a plurality of candidate documents from the library documents by comparing the coefficient of similarity for each of the plurality of library documents to a threshold;

selecting a second document from among the plurality of candidate documents; and transferring at least one style from the second document to the first document based on an object similarity score of an object of a plurality of objects in the second document, wherein the object similarity score is based at least in part on a relative position of the object in the second document.

2. The method of claim 1, further comprising:
calculating the object similarity score for each of the plurality of objects in the second document; and
comparing the object similarity score to an object similarity threshold to transfer to the at least one style.

3. The method of claim 1, wherein the plurality of document tags comprises:
at least one text tag; and
at least one image tag;
wherein Jaccard's similarity is applied to an array including the at least some of the plurality of document tags.

4. The method of claim 1, wherein the theme-based input comprises a selection of an explicit theme or an active-document based theme.

5. The method of claim 1, wherein transferring at least one style from the second document to the first document further comprises:
extracting style attributes from each of a plurality of objects in the second document; and
applying the style attributes to target objects in the first document.

6. The method of claim 1, further comprising:
prioritizing the plurality of candidate documents based on a theme-based similarity score; and
displaying at least a portion of each of the plurality of candidate documents in response to the prioritizing.

7. The method of claim 6, further comprising previewing the at least one style from the second document based on the prioritizing of the candidate documents so that the second document is a highest priority document.

8. A system comprising:
a memory component; and
a processing device coupled to the memory component, the processing device to perform operations comprising:
processing, in response to a theme-based input, one or more text statements from a first document using a text classification model and one or more images from the first document using an image classification model to generate a plurality of document tags corresponding to the first document;
generating, using Jaccard's similarity applied to at least some of the plurality of document tags, a coefficient of similarity between the first document and a plurality of library documents;
producing a plurality of candidate documents from the library documents by comparing the coefficient of similarity for each of the plurality of library documents to a threshold;
selecting a second document from among the plurality of candidate documents;
transferring at least one style from the second document to the first document based on an object similarity score of an object of a plurality of objects in the second document, wherein the object similarity score is based at least in part on a relative position of the object in the second document; and
displaying the first document with the at least one style as transferred.

9. The system of claim 8, wherein the operations further comprise:
calculating the object similarity score for each of the plurality of objects in the second document; and
comparing the object similarity score to an object similarity threshold to transfer to the at least one style.

10. The system of claim 8, wherein the plurality of document tags comprises:
at least one text tag; and
at least one image tag;
wherein Jaccard's similarity is applied to an array including the at least some of the plurality of document tags.

11. The system of claim 8, wherein the theme-based input comprises a selection of an explicit theme or an active-document based theme.

12. The system of claim 8, wherein the operation of transferring at least one style from the second document to the first document further comprises:
extracting style attributes from each of a plurality of objects in the second document; and
applying the style attributes to target objects in the first document.

13. The system of claim 8, wherein the operations further comprise:
prioritizing the plurality of candidate documents based on a theme-based similarity score; and
displaying at least a portion of each of the plurality of candidate documents in response to the prioritizing.

14. The system of claim 13, wherein the operations further comprise previewing the at least one style from the second document based on the prioritizing of the candidate documents so that the second document is a highest priority document.

15. A non-transitory computer-readable medium storing executable instructions, which when executed by a processing device, cause the processing device to perform operations comprising:
receiving theme-based input corresponding to a first document;
processing, in response to the theme-based input, one or more text statements from the first document using a text classification model and one or more images from the first document using an image classification model to generate a plurality of document tags corresponding to the first document;
producing, using Jaccard's similarity applied to at least some of the plurality of document tags, a plurality of candidate documents from a plurality of library documents based on a coefficient of similarity for each of the plurality of library documents;
selecting a second document from among the plurality of candidate documents; and a step for transferring at least one style from the second document to the first document based on an object similarity score of an object in the second document, wherein the object similarity score is based at least in part on a relative position of the object in the second document.

16. The non-transitory computer-readable medium of claim 15, wherein the executable instructions further cause the processing device to perform operations comprising:
calculating the object similarity score for each of a plurality of objects in the second document; and
comparing the object similarity score to an object similarity threshold to transfer to the at least one style.

17. The non-transitory computer-readable medium of claim 15, wherein the theme-based input comprises a selection of an explicit theme or an active-document based theme.

18. The non-transitory computer-readable medium of claim 15, wherein transferring the at least one style from the second document to the first document further comprises:
extracting style attributes from each of a plurality of objects in the second document; and
applying the style attributes to target objects in the first document.

19. The non-transitory computer-readable medium of claim 15, wherein the executable instructions further cause the processing device to perform operations comprising:
prioritizing the plurality of candidate documents based on a theme-based similarity score; and
displaying at least a portion of each of the plurality of candidate documents in response to the prioritizing.

20. The non-transitory computer-readable medium of claim 19, wherein the executable instructions further cause the processing device to perform an operation of previewing the at least one style from the second document based on the prioritizing of the candidate documents so that the second document is a highest priority document.

\* \* \* \* \*